(12) United States Patent
Patrich et al.

(10) Patent No.: US 10,943,009 B2
(45) Date of Patent: Mar. 9, 2021

(54) SYSTEM AND METHOD TO INFER INVESTIGATION STEPS FOR SECURITY ALERTS USING CROWD SOURCING

(71) Applicant: MICROSOFT TECHNOLOGY LICENSING, LLC, Redmond, WA (US)

(72) Inventors: Dotan Patrich, Kfar Saba (IL); Yaakov Garyani, Raanana (IL); Moshe Israel, Ramat-Gan (IL); Yotam Livny, Gadera (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 192 days.

(21) Appl. No.: 16/190,658

(22) Filed: Nov. 14, 2018

(65) Prior Publication Data
US 2020/0151326 A1    May 14, 2020

(51) Int. Cl.
*G06F 21/55* (2013.01)
*G06N 20/00* (2019.01)
*G06N 5/04* (2006.01)

(52) U.S. Cl.
CPC .............. *G06F 21/554* (2013.01); *G06N 5/04* (2013.01); *G06N 20/00* (2019.01); *G06F 2221/034* (2013.01)

(58) Field of Classification Search
CPC .................................................. G06F 21/554
See application file for complete search history.

(56) References Cited

U.S. PATENT DOCUMENTS

| | | | | |
|---|---|---|---|---|
| 8,881,288 | B1* | 11/2014 | Levy ................... | H04L 63/1408 726/25 |
| 10,242,201 | B1* | 3/2019 | Chen ..................... | G06F 21/552 |
| 2010/0138368 | A1* | 6/2010 | Stundner ................ | G06N 20/00 706/12 |
| 2018/0248893 | A1 | 8/2018 | Israel et al. | |
| 2019/0250998 | A1* | 8/2019 | Bedadala ............ | G06F 11/1469 |
| 2019/0258953 | A1* | 8/2019 | Lang ...................... | G06N 5/025 |

(Continued)

OTHER PUBLICATIONS

Mirheidari, et al., "Alert Correlation Algorithms: A Survey and Taxonomy", in repository of arXiv, arXiv:1811.00921, Nov. 2, 2018, 16 Pages.

(Continued)

*Primary Examiner* — Simon P Kanaan
(74) *Attorney, Agent, or Firm* — Workman Nydegger

(57) ABSTRACT

Techniques are provided to dynamically generate response actions that may be used to investigate and respond to a security alert. Different prediction models are initially trained using a corpus of training data. This training data is obtained by identifying previous security alerts and then grouping together alert clusters. An analysis is performed to identify which steps were used to respond to the alerts in each group. These steps are fed into a prediction model to train the model. After multiple models are trained and after a new security alert is received, one model is selected to operate on the new alert, where the model is selected because it is identified as being most compatible with the new alert. When the selected model is applied to the new alert, the model generates a set of recommended steps that may be followed to investigate and/or respond to the new alert.

20 Claims, 9 Drawing Sheets

(56) References Cited

U.S. PATENT DOCUMENTS

2019/0318203 A1\* 10/2019 Jou ........................ G06N 20/00
2019/0356505 A1\* 11/2019 Madden .............. H04L 12/2812
2019/0356506 A1\* 11/2019 Beach ................. H04L 12/2812

OTHER PUBLICATIONS

"International Search Report and Written Opinion Issued in PCT Application No. PCT/US19/58609", dated Jan. 20, 2020, 28 Pages.
Stroeh, et al., "An Approach to the Correlation of Security Events Based on Machine Learning Techniques", in Journal of Internet Services and Applications vol. 4, Issue 1, Mar. 11, 2013, pp. 1-16.

\* cited by examiner

Audit Report
300

| Alert Date | Alert Type | Computer | Related Process | IP Address | Port | User | Metadata |
|---|---|---|---|---|---|---|---|
| 9/5/2018 8:32:56 | Update | ASC-VA-Demo-01 | Process A | 192.168.12.1 | 5 | User Z | Metadata A |
| 9/5/2018 10:54:23 | Update | ASC-VA-Demo-02 | Process B | 192.168.12.2 | 4 | User X | Metadata B |
| 9/5/2018 13:01:21 | Access | ASC-VA-Demo-03 | Process C | 192.168.12.3 | 2 | User C | Metadata C |
| 9/5/2018 14:00:59 | Security | ASC-VA-Demo-01 | Process A | 192.168.12.2 | 3 | User V | Metadata D |
| 9/5/2018 15:35:23 | Rollup | ASC-VA-Demo-01 | Process A | 192.168.12.2 | 6 | User B | Metadata E |
| 9/5/2018 15:35:27 | Malware | ASC-VA-Demo-02 | Process B | 192.168.12.2 | 4 | User X | Metadata B |
| 9/5/2018 15:35:29 | Virus | ASC-VA-Demo-02 | Process B | 192.168.12.2 | 4 | User X | Metadata B |

*Figure 3*

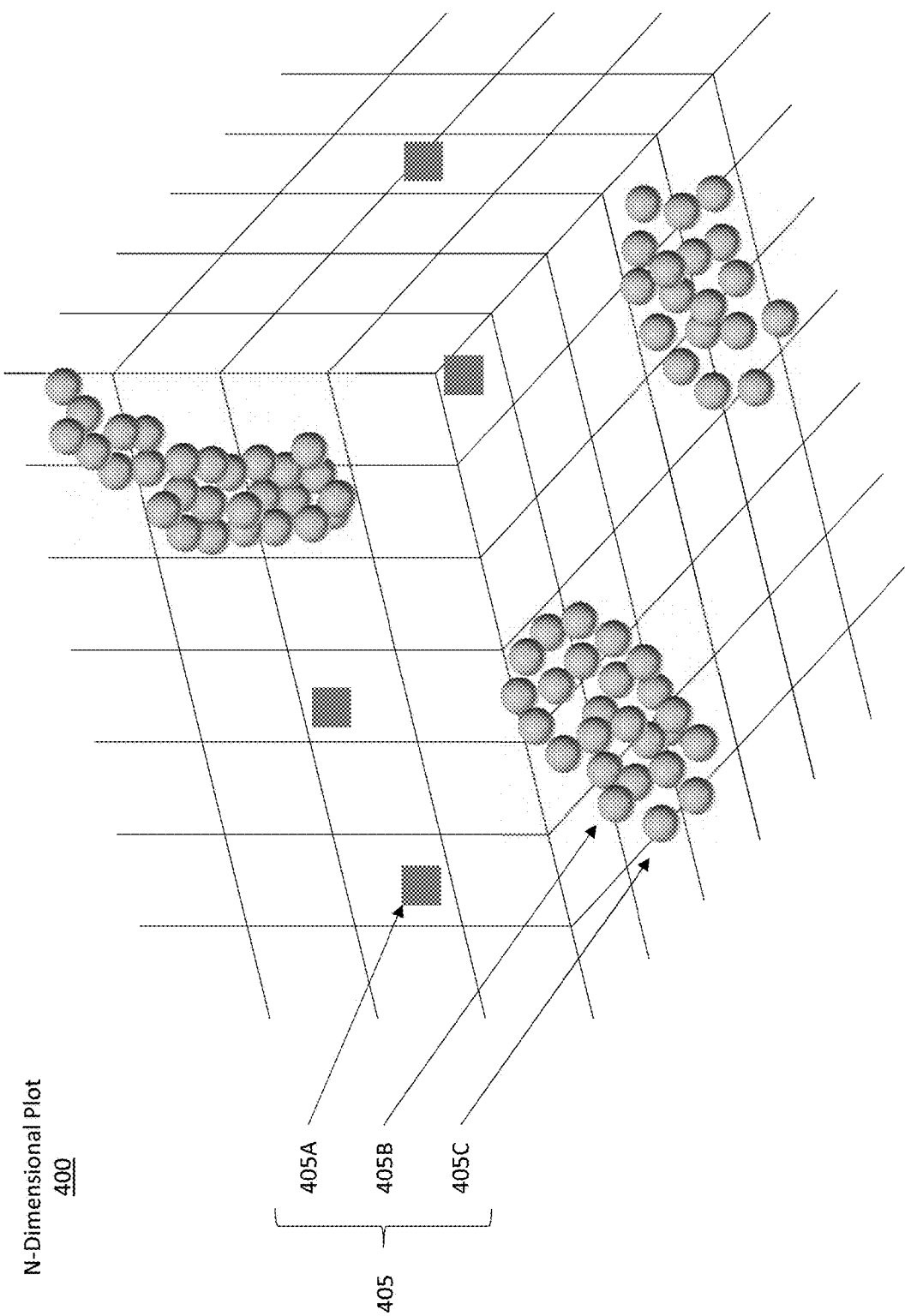

SYSTEM AND METHOD TO INFER INVESTIGATION STEPS FOR SECURITY ALERTS USING CROWD SOURCING

BACKGROUND

Computers and computing systems have affected nearly every aspect of modern living. For instance, computers are generally involved in work, recreation, healthcare, transportation, entertainment, and even household management (e.g., Internet of Things ("IoT") devices).

Oftentimes, computers run into problems and will raise a security alert. As used herein, the terms "security alert" and "alert" are interchangeable with one another and should be interpreted broadly to mean any type of computer-related occurrence or alert. In some instances, an administrator may respond to an alert, for example, to help improve, manage, or resolve a computer's efficiency or operational state. As used herein, the term "administrator" should also be interpreted broadly to mean any type of human responder or computer system capable of responding to such alerts. It will be appreciated that the occurrence of a security alert may adversely impact the operations of a computer system, including its efficiency, or may adversely impact a user's experience in using the computer system. By way of example, a user may be locked out of their account, a computer update may be pending installation, or a computer system may experience lag as a result of a malicious application executing on the computer system. These and other events can trigger alerts. And, it is highly desirable to investigate and respond promptly to these security alerts.

Choosing the right steps to take when investigating a security alert is a difficult problem that has plagued many administrators. Often, this investigative process is based on trial-and-error. Equally often, this process requires an exorbitant amount of time and sometimes even luck to resolve successfully. Because the investigative process is so laborious, the computer system facing the security alert is routinely "down" for a prolonged period of time, resulting in significant operational inefficiencies and frustrations on both users and administrators who are tasked with resolving/responding to the security alerts. Consequently, there is a need in the industry to improve how security alerts are investigated and responded to.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments relate to computer systems, methods, and devices that dynamically generate a sequence of recommended response actions for responding to security alerts. These response actions are generated by feeding the security alert into a specially designed prediction model, which then derives the customized response actions based on attributes of the alert. Initially, a corpus of training data (which is used to train multiple different prediction models) is generated by compiling together many previously-raised security alerts. Once these alerts are identified, then different clusters of those security alerts are grouped together. For each of at least some (and perhaps all) of the previous security alerts in each of the different clusters, a corresponding sequence of steps is identified, where the steps are those that were utilized when responding to the corresponding previous security alert. Subsequently, a prediction model is trained for each of the different clusters. The training of these prediction models is performed using these sequences of steps. After the prediction models are trained and after a new security alert is received, at least one of the prediction models is selected to operate on this new security alert. This prediction model is selected because its attributes most closely align with the new security alert's attributes/characteristics. That is, out of all of the available prediction models, the one that is selected has attributes that most closely match, or rather most closely align, with the attributes of the new security alert. Consequently, the selected prediction model is "optimal" (as compared to and selected from the cluster) for being applied to the new security alert and, in some instances, for resolving/addressing the security alert. The selected prediction model is then applied to the new security alert, which causes the model to derive/produce a set of recommended steps to follow for responding to the alert.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which:

FIG. 3 illustrates an example of security alert audit data, which may be used to train the prediction models.

FIG. 4 is a graphical representation of a set of plotted security alerts, where different subsets of these alerts are generally clustered together as a result of their characteristics being related to one another.

DETAILED DESCRIPTION

Figure 1:
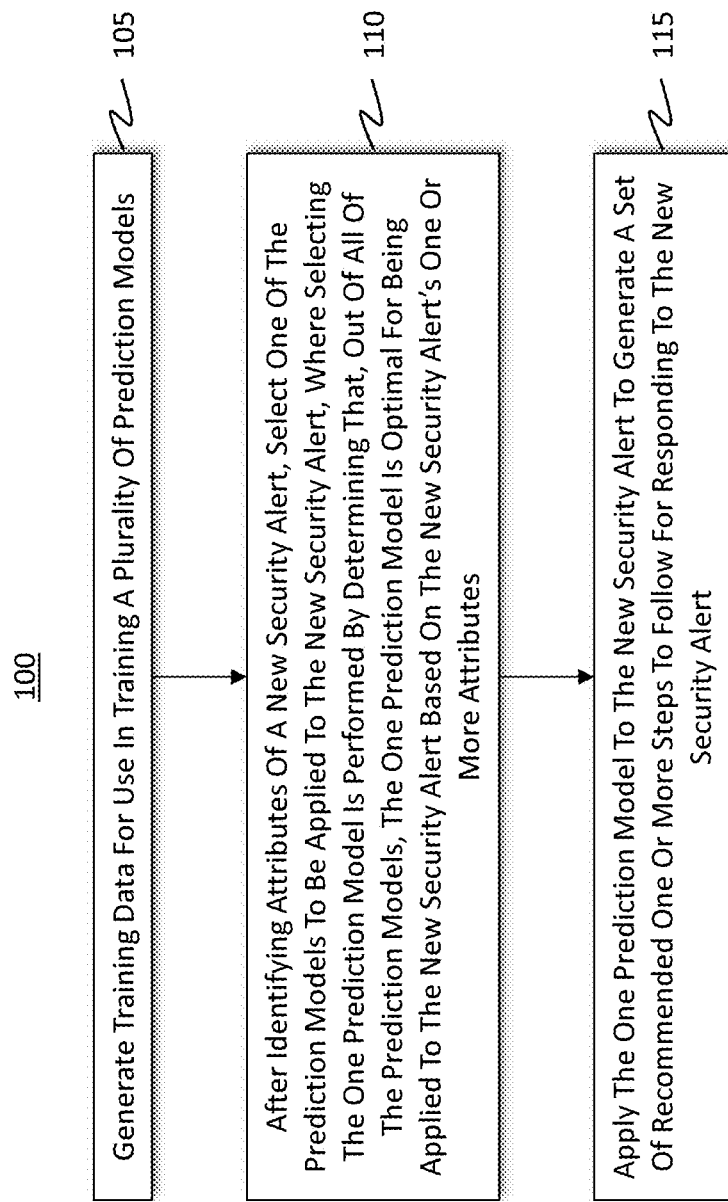
FIG. 1 illustrates a flowchart of an example method for dynamically generating a set of recommended response actions that may be performed when responding to a security alert.

Disclosed embodiments relate to computer systems, methods, and devices that dynamically generate a sequence of response actions that may be performed in response to the detection of a new security alert. Such embodiments significantly improve how security alerts are investigated and responded to.

In some embodiments, multiple prediction models are initially trained using past security alert data. More specifically, the embodiments identify how these past security alerts were previously responded to, and then the embodiments feed that data into any number of prediction models (e.g., machine learning devices, artificial intelligence engines, neural networks, or any other type of learning system, as described in further detail later). After being trained, these prediction models are available to be applied to any number of new security alerts. The embodiments also beneficially select a prediction model that will operate most efficiently with a new security alert and that will provide the most tailored recommendation for that alert. In this regard, the selected prediction model is selected because it is determined to be the most compatible with the security alert (at least when compared to the compatibility of the other available prediction models). Such a selection is performed by identifying a specific prediction model whose attributes most closely align with the attributes of the new security alert.

Technical Benefits

The disclosed embodiments may be used to improve the current technology in a vast number of different ways. For example, as discussed earlier, traditional techniques for responding to security alerts often require experience, luck, or performance of a laborious trial-and-error process. Oftentimes, administrators are required to spend an exorbitant amount of time investigating security alerts because those administrators do not know exactly what type of security alert they are dealing with or because there are no established practices/procedures for dealing with a particular type of security alert.

The disclosed embodiments provide significant advantages over these traditional techniques by generating and maintaining an extensive repository or corpus of crowd-sourced training data. This training data is a compilation of past techniques (both successful techniques, partially successful techniques, and failed techniques) that were used in responding to previous security alerts. By understanding how prior security alerts were responded to (both successfully and unsuccessfully), a machine learning mechanism can be trained to identify patterns, correlations, and other similarities between the past alerts and how those past alerts were responded to. Using this training data, the machine learning mechanism (e.g., a "prediction model"), upon receiving a new security alert, can apply its learned understanding to the new security alert and generate a sequence of recommended actions on how to respond to that new alert. In this manner, the disclosed embodiments help to remove the doubt and guesswork that the administrators were previously required to use and can help improve the manner in which a computing system can identify and/or apply steps for responding to alerts.

In this regard, the disclosed embodiments train machine learning models and utilize a crowd-sourced repository of learned knowledge to improve how security alerts are responded to. It will be appreciated that such embodiments not only improve the efficiencies of the administrator in his/her daily operations (i.e. they improve how an administrator interacts with the computer system), but the embodiments also improve the operations of the computer system itself. To illustrate, when a computer system is no longer operating (or not operating as well as it should be) as a result of a security alert (e.g., perhaps an account was locked out or perhaps a virus is present on the computer system), such conditions lead to serious inefficiencies on the computer's part. By practicing the disclosed principles, however, resolutions to the above problems can be quickly identified and implemented, thereby bringing the computer back up to an efficient operational state much faster than what was previously possible. In this manner, the disclosed embodiments significantly improve the operations of the computer system itself by reducing the amount of "down" time the computer system will face. As such, the computer system will be able to perform more operations, thereby resulting in the improved efficiencies. Accordingly, the disclosed embodiments provide a technical solution (e.g., using crowd-sourced knowledge for preparing a recommendation) to a technical problem (e.g., what steps should be followed in responding to a security alert). Furthermore, as described above, the disclosed embodiments provide significant improvements to human operations, computer operations, and human-computer interactions.

Example Method(s)

Attention will now be directed to FIG. 1 which refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. The method presented in FIG. 1 is provided to introduce the disclosed embodiments while subsequent portions of the disclosure will more fully clarify different aspects of the disclosed embodiments.

FIG. 1 illustrates a flowchart of an example method 100 for dynamically generating (e.g., in real-time or on an as-needed basis) a sequence of one or more recommended response actions that are generated in response to feeding (i.e. providing as input) a new security alert into a prediction model that has been specially trained to respond to at least somewhat similar or related types of security alerts. In some instances, it is possible that a new security alert might not be related to any past security alert included in the corpus of training data. Notwithstanding such a scenario, the embodiments are still able to analyze the security alert and provide an intelligently selected set of response actions.

Initially, method 100 includes an act 105 of generating training data for use in training multiple different prediction models. Such a training process is highly beneficial because it allows the embodiments to "tune," or otherwise tailor, a prediction model to a particular type of security alert.

For instance, as will be discussed in more detail later, the disclosed embodiments are able to maintain a large repository/corpus of training data by compiling data from many different sources, such as, for example, audit logs, insight data (e.g., survey data which collected answers to questions on how administrators would go about responding to a particular security alert), crowd-sourced data (e.g., information collected from members of the public who perhaps have specialized knowledge on a particular topic), or any other type of computer log or recording mechanism.

Figure 2:
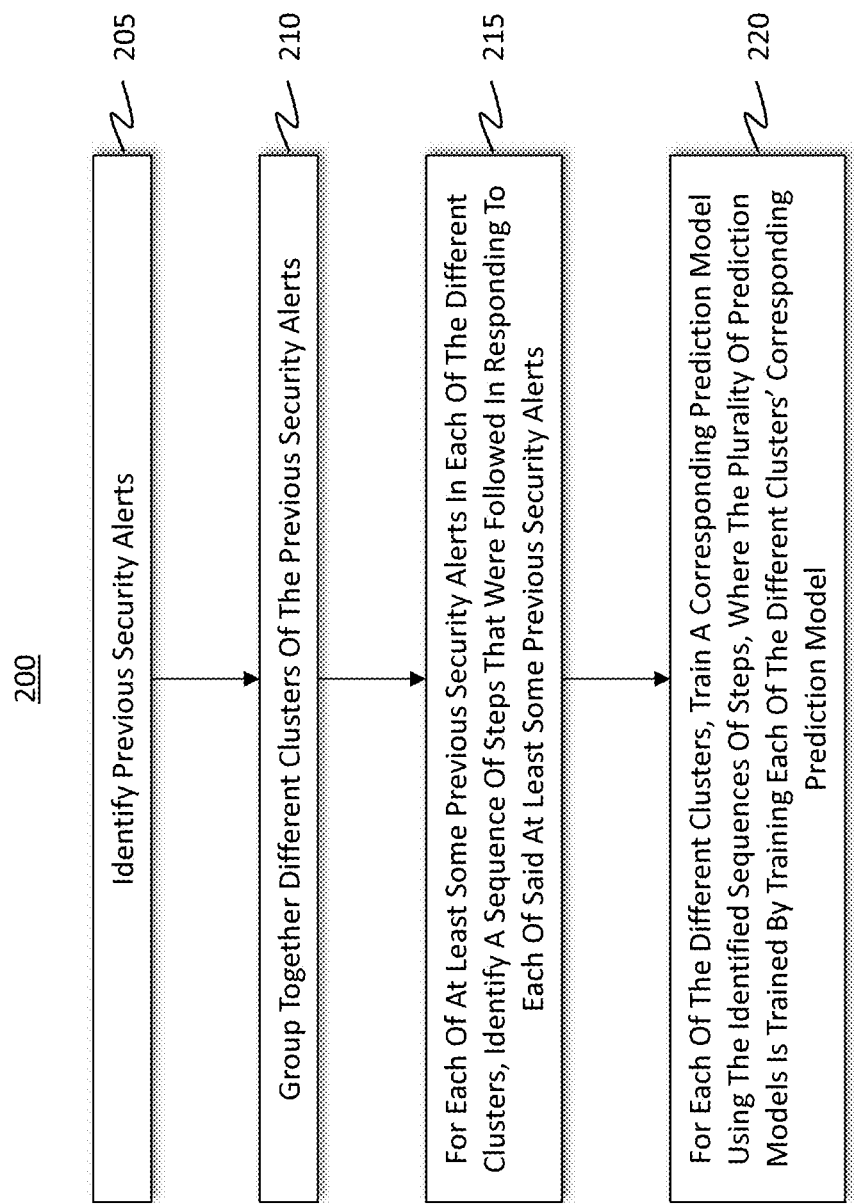
FIG. 2 illustrates a flowchart of an example method for training any number of prediction models, where any one or more of these models can be used to derive/generate the recommended response actions.

FIG. 2 further elaborates on how some of the embodiments perform act 105 from method 100. Specifically, FIG. 2 shows a flowchart of an example method 200 for performing the above-recited training process. Method 200 initially includes an act 205 of identifying the previous security alerts that were obtained from the audit logs, the insight data, and/or any other compilation of data describing both a security alert and how that security alert was responded to (i.e. what sequence of steps were used to resolve that security alert).

Turning briefly to FIG. 3, there is shown an example of an audit report 300 that includes a wealth of information about different security alerts. To illustrate, audit report 300 includes different headings, such as, for example, Alert Date, Alert Type, Computer, Related Process, IP Address, Port, User, and Metadata. The Alert Data field corresponds to the data and time when a particular alert was identified. The Alert Type corresponds to the type of the alert, where some non-limiting examples of alert type include, but are not limited to, update alerts, access alerts (both unauthorized access attempts and authorized but perhaps suspicious access events), security alerts, malware alerts, virus alerts, or any other type of security alert. The Computer field identifies which computer system the security alert was raised on.

The Related Process field corresponds to an application, API, thread, kernel, operating system ("OS"), account, or other operating entity that was identified as being either the first entity to identify the security alert or, alternatively, as being the entity that actually caused the security alert. For example, in situations where it is unknown which entity caused a security alert, then the Related Process could be the first, second, or any subsequent application or entity that identified the security alert. In other situations, the Related Process could explicitly identify the exact application or other entity that actually caused the security alert to be raised.

The IP Address corresponds to the internet protocol ("IP") address of the computer system on which the security alert was raised. Similarly, the Port identifies the port on which the security alert was raised. It will be appreciated that the Port field can identify any type of port on which the alert was raised. Some non-limiting examples of ports include, but are not limited to, a TCP port, a UDP port, a serial or COM port, other types of parallel ports, an audio port (e.g., surround sound connection or 3.5 mm TRS connection), a video port (e.g., VGA, DVI, HDMI, etc.), a RCA connection, or even a USB port. Based on this disclosure, it will be appreciated that any type of port may be identified and listed in the audit report 300.

The audit report 300 may also include information describing a user who was using the computer or who was otherwise logged onto the computer at the time the security alert was raised. It will be appreciated that the User field may include any kind of identifying information about the user such as, for example, name, account type, username, password, sign-on and sign-off times, frequency of use, subscription or tenant type, and so forth.

Finally, the Metadata field may include any other information describing the security alert or even any additional information not included in any of the other fields. In some instances, the Metadata field may additionally include a sequence of steps describing how the security alert was responded to, as will be described in more detail to follow. Accordingly, a wealth of information may be provided in the audit report 300. Other attributes included in the audit report 300 may include the size or type of customer or tenant involved, a deployment or subscription type or size, or even a version of software or OS that is currently being used on the alerted machine (or even a version of a file), where these other attributes also share a relationship with the security alert.

It will also be appreciated that an individual computer system may provide the audit report 300. Additionally, or alternatively, any number of other computer systems from all across the world may respectively provide their own audit report such that the collection of multiple reports results in a so-called "crowd-sourced" repository of training data.

Returning to the training process outlined in FIG. 2, method 200 additionally includes an act 210 of grouping together different clusters of the previous security alerts. Many security alerts share common attributes or characteristics with one another. For example, in FIG. 3, the audit report 300 shows that multiple security alerts were performed by "Process A" in the Related Process field. Additionally, audit report 300 shows that multiple security alerts were performed on port "4." Multiple security alerts are also of the same type (e.g., an "Update" type), and many security alerts are related to the same user (e.g., "User X"). Of course, other relationships may exist between different security alerts, even alerts that were generated by entirely different users and different computer systems. The larger the corpus of security alerts that is obtained, the more likely it is that common attributes of those security alerts will be detectable, and it will be easier to identify relationships between the security alerts. Regardless of size, however, it is still possible to characterize different common clusters or groups of the security alerts based on one or more shared attributes between the different security alerts.

In some instances, the clusters of different security alerts and their common/shared attributes may be determined by machine learning (as described in more detail below) and or explicitly specified with user input.

Additionally, it will be appreciated that many of the administrative/investigative techniques used to respond to those security alerts will also be similar and can be detected through monitoring, machine learning and/or explicitly specified through user input. Examples of such investigative techniques will be provided later. As such, the descriptive data stored in the Metadata field, which descriptive data may include the sequence of steps (i.e. these investigative techniques/steps) used to respond to the security alert, may be analyzed and correlations or other types of relationships may be identified between different investigative responses and between different security alerts.

FIG. 4 shows a N-dimensional plot 400 of multiple security alerts 405 (e.g., security alert 405A, security alert 405B, and security alert 405C) that have been plotted in the N-dimensional plot 400. While only a few security alerts are actually labeled and visualized in the N-dimensional plot 400, it will be appreciated that the N-dimensional plot 400 may be scalable and may be flexibly designed to accommodate any number of security alerts (e.g., hundreds, thousands, millions, etc.). It will also be appreciated that these security alerts are plotted in the N-dimensional plot 400 based on their respective identified attributes (e.g., the information contained in the audit report 300 from FIG. 3). Furthermore, it will be appreciated that use of "N" in the N-dimensional description indicates that any number of dimensions may be used when plotting these security alerts (e.g., two dimensions, three dimensions, or any sized matrix).

With reference back to FIG. 2, act 210 stated that different clusters of security alerts may be grouped together. Furthermore, the earlier discussion described how many security alerts will likely share common characteristics/attributes with one another. FIG. 4 shows these clustered relationships by illustrating how many of the security alerts are generally/naturally clustered together (e.g., as a result of them sharing one or more attributes with one another). The disclosed embodiments are able to identify these relationships, trends, or shared attributes, and formally group the security alerts based on their identified clustered relationships, as shown in FIG. 5.

Figure 5:
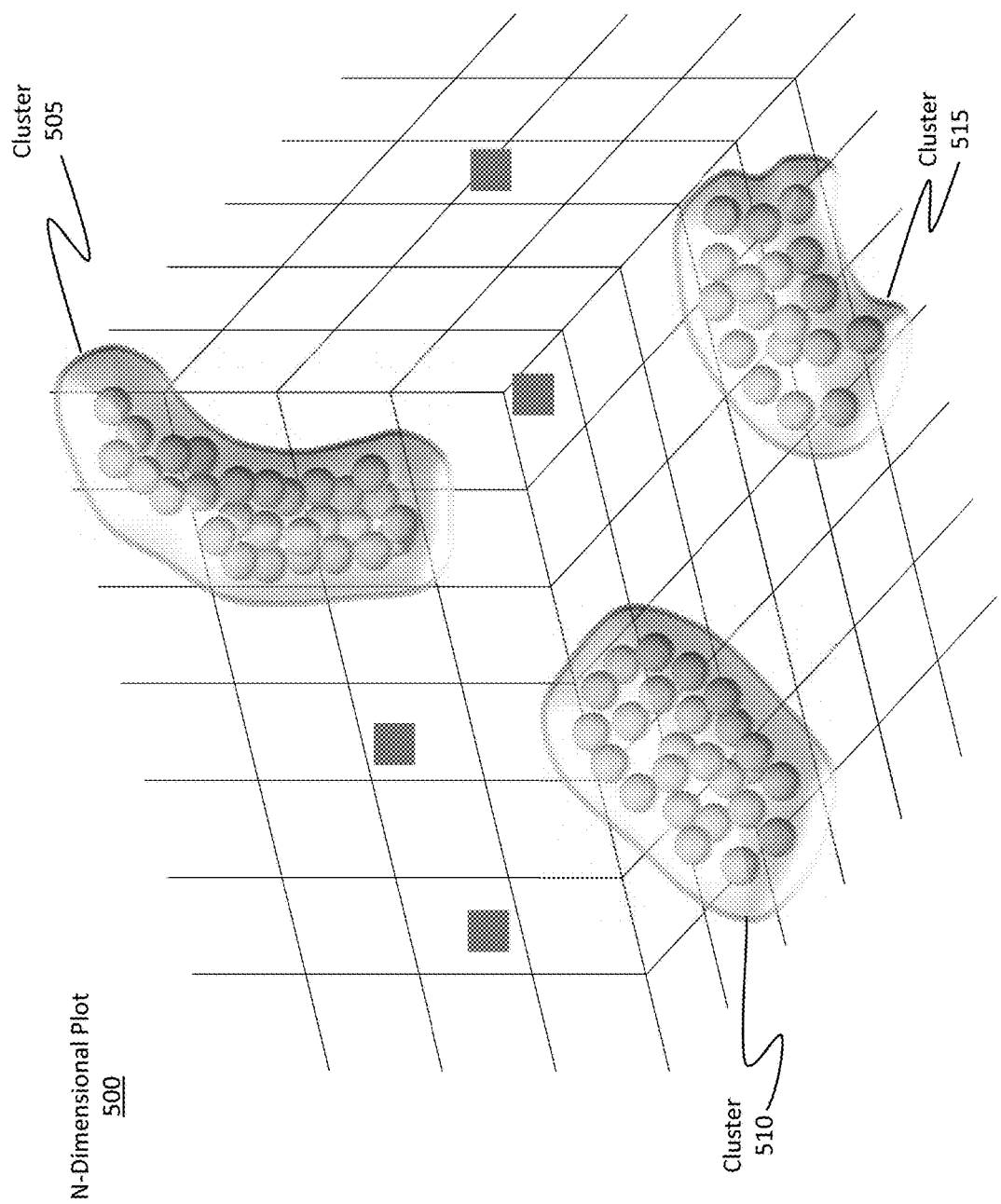
FIG. 5 shows an example technique for grouping together these different clusters of security alerts.

More specifically, FIG. 5 shows a N-dimensional plot 500, which is an example implementation of the N-dimensional plot 400 from FIG. 4, with a number of identified groups, or clusters. These clusters include cluster 505, cluster 510, and cluster 515. It will be appreciated that any number of clusters may be identified from the plotted security alerts. Furthermore, it will be appreciated that the embodiments do not necessarily have to visually plot the security alerts or the clustered groupings in a particular ordering to identify their similar relationships. In some embodiments, a k-means clustering algorithm is used to perform the clustering process. In some alternative or additional embodiments, a density-based spatial clustering (DB-SCAN) algorithm is used. Combinations of the above clustering techniques may also be used. Additionally, or alternatively, other clustering algorithms or techniques may be used. As will be discussed in more detail later, different mechanisms/components may be used to perform the clustering process such as, for example, any type of machine learning algorithm, such as a neural network or deep learning network. In this regard, the process of grouping together the different clusters of the previous security alerts may be performed by identifying one or more attributes for each alert included in the previous alerts and by generating the different "clusters" by grouping together common alerts that are identified as having commonalities between their corresponding one or more attributes (e.g., such as, but not limited to, alert type, alert date, alert metadata, and so forth).

Figure 6:
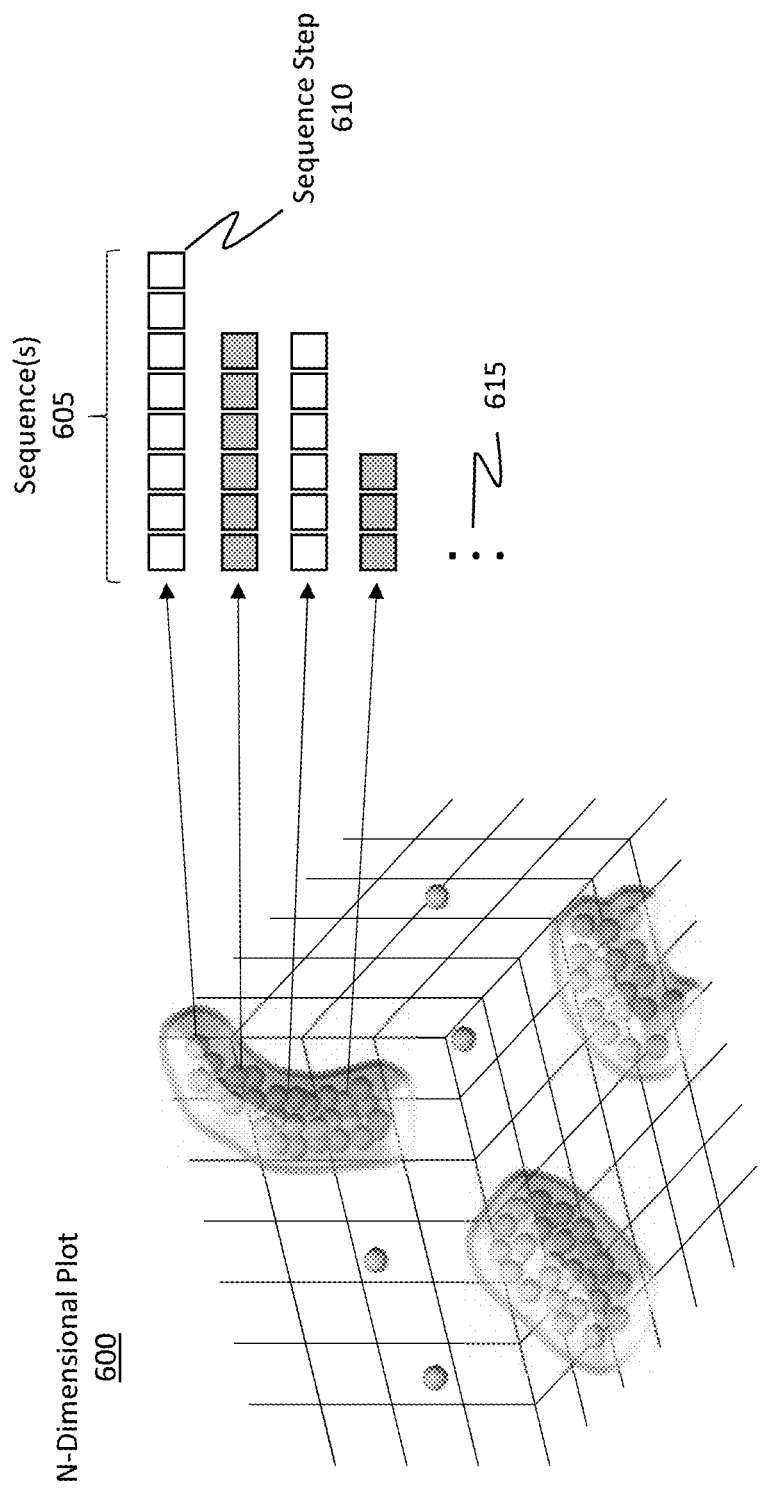
FIG. 6 illustrates how sequences of response actions may be identified for each security alert in each group, where each respective sequence includes a set of actions that were performed when responding to each corresponding security alert.
Figure 7:
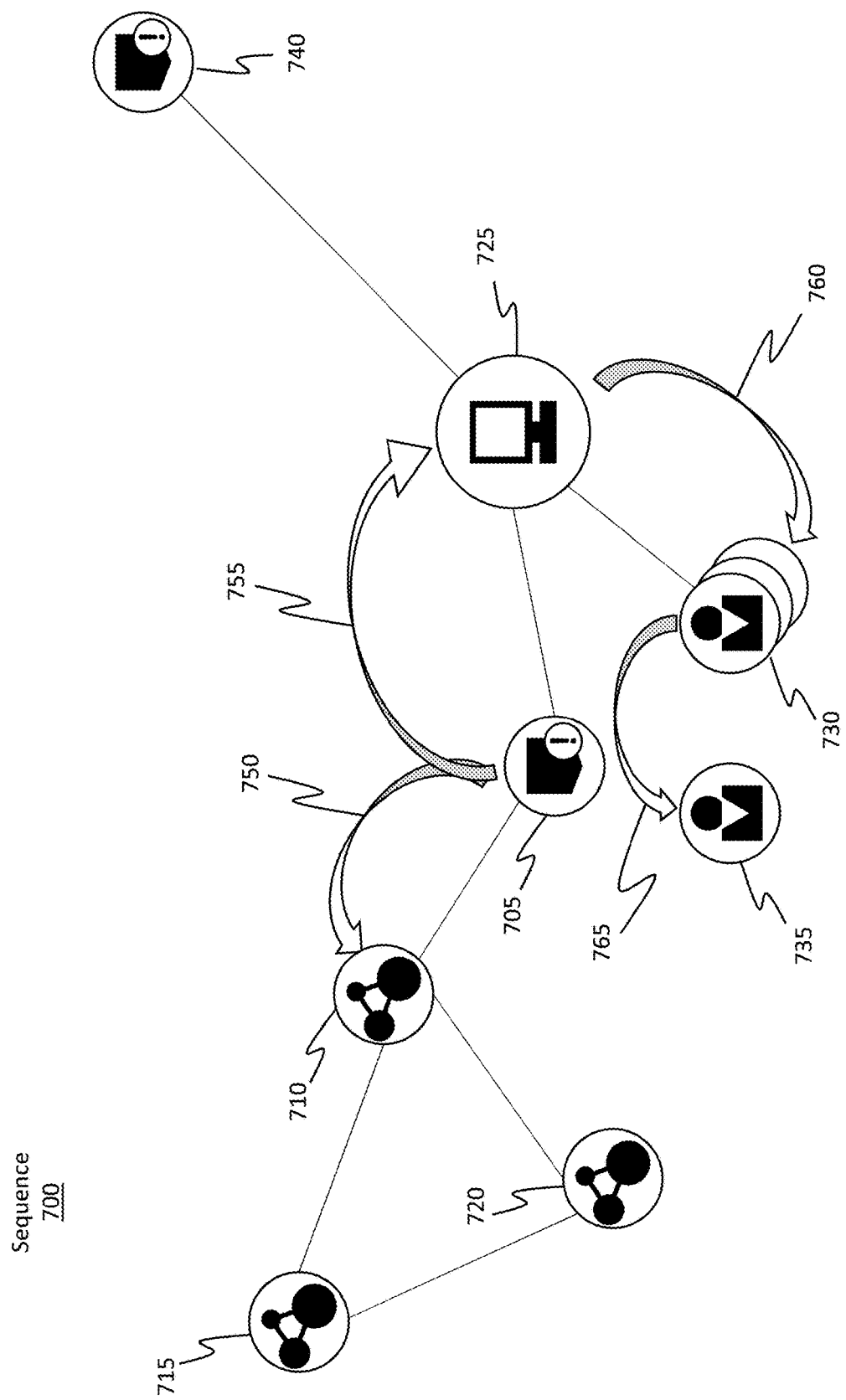
FIG. 7 further elaborates on how it is beneficial to identify sequences of response actions that were performed for the security alerts.

Returning to the training techniques described by method 200 in FIG. 2, act 215 describes a process in which a particular sequence of steps that were followed in responding to each of the previous security alerts is then identified. This process may be performed for one, some, or even all of the previous security alerts in a particular group. Additionally, this process may be performed for one, some, or even all of the identified groups. This act also includes the process of identifying which specific steps (i.e. response actions) were used to respond to a particular security alert. In other words, this act identifies those actions that an administrator performed (either successfully or unsuccessfully) in response to (and potentially in an attempt to resolve) that security alert. FIGS. 6 and 7 more fully describe this aspect.

FIG. 6 shows a N-dimensional plot 600, which is an example implementation of the N-dimensional plot 500 of FIG. 5. FIG. 6 also shows a number of different sequences 605 for different security alerts, where each individual sequence includes one or more sequence steps (e.g., sequence step 610). The ellipsis 615 demonstrates that any number of sequences may be identified, as well as any number of sequence steps. Generally, each sequence included among the sequences 605 describe a number of steps that were used to respond to a particular security alert. It will be appreciated that in some instances, an administrator may have responded/resolved a security alert using only a single step while in other instances the administrator may have used dozens, hundreds, or even thousands of steps to investigate and respond to a security alert. It will also be appreciated that the absence of an action (e.g., the administrator ignored the alert) can also be considered a step in responding to an alert and can also be used as a part of the training data.

FIG. 7 provides more detail regarding a particular sequence 700, which is one example sequence included among the sequences 605 from FIG. 6. FIG. 7 shows a number of different contributing entities or relevant occurrences, such as, for example, an initial alert 705, a related process 710 (e.g., an application that caused alert 705 to be raised), another related process 715 (e.g., a process dependent on the application), another related process 720 (e.g., perhaps another dependent process), a computer system 725 (e.g., a computer system executing the application), a group of users 730 (e.g., users who have accounts on the computer system 725), a specific user 735 (e.g., the user who was active when the alert was raised), and another alert 740. In responding to the alert 705, an administrator may initially perform an investigative execution step of querying 750 the related process 710. Based on this initial investigative query, in this example, the administrator performed an analysis to determine whether the related process 710 was the culprit of the security alert 705.

After determining that the related process 710 was not the culprit, the administrator then performed another investigative execution step of querying 755 the computer system 725 on which the security alert 705 was raised to learn more about the computer system 725. Subsequently, the administrator performed another investigative execution step 760 to learn which group of users 730 are associated with the computer system 725. After performing an analysis on a result of the query as well as an analysis on certain attributes of the security alert 705, the administrator performed another investigative execution step and queried 765 a specific user 735 that was included in the group of users 730. By analyzing the specific user's information (in this specific example), the administrator was able to determine that this particular security alert 705 was raised as a result of the specific user 735 attempting to access restricted content. In this regard, the administrator performed a number of investigative steps to learn about the security alert 705 and to eventually respond to and resolve that security alert 705. It will be appreciated that the preceding example is provided for illustrative purposes only and should not be considered limiting or otherwise binding on the disclosed embodiments.

Accordingly, sequence 700, in this particular example, included a number of investigative execution steps (e.g., different queries or other investigative procedures) and a number of investigative analysis steps. Such investigative steps may be recorded in an audit log (e.g., the audit log 300 from Figure) or may be provided from survey/insight data or other data collected from external entities. FIG. 7 also shows that one branch of the sequence steps (specifically query 750) did not significantly contribute to resolving, or rather identifying, the cause of the security alert (other than to learn that the related process 710 was not the culprit). In this regard, query 750 actually resulted in at least some inefficiencies being introduced into the investigative process. By following the disclosed principles, as will be discussed in more detail to follow, a condensed and refined sequence of response actions may be provided to an administrator to enable that administrator to more quickly investigate and resolve a security alert.

Returning back to the training process of FIG. 2, method 200 then includes an act 220 of training a prediction model for each of the different clusters using the identified sequences of steps (e.g., sequences 605 from FIG. 6 or even sequence 700 from FIG. 7). That is, because each cluster includes security alerts which generally share one or more common attributes and because each cluster is different from one another, it is beneficial to train a unique prediction model for each respective cluster. In this manner, prediction models can be specially tuned to operate for security alerts that share a particular type or attribute. Such tuning enables the prediction model to provide a more reliable recommendation regarding how best to respond to a particular security alert (e.g., perhaps the administrator can skip the query step 750 in FIG. 7 and instead directly query the group of users 730). In this regard, the prediction models are each individually trained using data acquired from an assigned or related cluster. Method 200, therefore, represents an example process for generating training data used in training a plurality of prediction models, as described in act 105 of method 100.

It will be appreciated that the disclosed training implementations are highly tunable and scalable. In some instances, a quick training technique may be desired. In such cases, only a relatively small sampling size of the sequence data may be used to train the prediction models. Because a smaller sized set of training data is used, the training process may be shortened and thus less time initially expended. In contrast, a robust and highly detailed training technique may be desired in which case a large sized set of training data will be used. It will be appreciated that while a prediction model may be trained more quickly with a smaller set of training data, the output of such a prediction model may not be as reliable as the output of a model that used more training data. That said, different design parameters may call for different sized training sets. Accordingly, the disclosed embodiments may be adjusted or otherwise refined to suit any type of design requirement.

Therefore, returning to FIG. 1, method 100 subsequently includes an act 110 in which a new security alert is received after the prediction models are trained using the training data. In act 110, attributes of the new security alert are first identified. Some non-limiting examples of these attributes include, but are by no means limited to, the alert's date and time, the alert's type, information describing the computer system that raised and/or first detected the security alert, any related processes associated with the security alert, IP address and/or port information related to the security event, user account information (e.g., of a user who was using the computer when the security alert was raised), or any other metadata describing the security alert.

Once attributes are identified, then the embodiments select one of the prediction models to be applied to the new security alert. Here, this selection process is performed by determining that, out of all of the different available prediction models, one particular prediction model (i.e. the selected prediction model) is "optimal" for being applied to the new security alert.

As used herein, the term "optimal" refers to a scenario in which a particular prediction model's attributes are identified as being most closely aligned or compatible with, or most closely related to, the security alert. As an example, suppose the security alert has attributes A, B, and C. Further suppose there are three available prediction models. In this example, the first prediction model is generally applicable for security alerts having attributes A, D, and E (e.g., the prediction model was trained using clustered alerts having at least those three attributes, thereby resulting in the prediction model being specially tuned for those types of alerts). The second prediction model has attributes B, F, and G, and the third prediction model has attributes A, C, and H. In this example, the first prediction model shares only attribute A with the security alert, and the second prediction model shares only attribute B with the security alert. In contrast, the third prediction model shares attributes A and C with the security alert. Consequently, out of these three prediction models, the third prediction model most closely aligns with, or rather is most compatible with, the security alert because it shares the largest number of common attributes with the security alert. Therefore, the third prediction model is considered to be optimal (i.e. best or most favorable) for being applied to the security alert.

In the event that there is not a clear distinction between the compatibilities of the prediction models with the security alert, then the embodiments may arbitrarily select a prediction model via random selection, or they may prompt the administrator to provide a selection or to provide additional data. Additionally, or alternatively, the embodiments may request and/or automatically seek out updated information in an attempt to make a clear distinction as to which prediction model is most appropriate/suitable for a particular security alert. In some embodiments, a time delay may be introduced in order to acquire more data about the security alert or even to allow the prediction models to continue to learn new information and adapt to new situations.

While the above discussion focused on a scenario where only a single prediction model is selected, some embodiments may select (and eventually apply) more than one prediction model to the same security alert. Such a process may be performed in an attempt to generate multiple sequences of recommended response actions so as to provide a more robust analysis and recommendation. In some embodiments, the different recommendations may then be compared to one another to determine which one has the highest probability of fully investigating and responding to the security alert. In some embodiments, the recommendation with the highest probability may then be provided to an administrator while in other embodiments all of the recommendations may be provided. As will be discussed in more detail later, some embodiments also provide the probability metrics to the administrator, so the administrator can make a more informed decision on how to proceed.

Accordingly, it will be appreciated that the prediction model selection process is performed by comparing the new security alert's attributes against the attributes of one, some, or all of the different prediction models to identify at least the one prediction model whose characteristics are most closely aligned with those of the new security alert's attributes. As discussed, in some cases, multiple prediction models may be applied to the security alert in order to provide multiple different recommendation options. Determining the number of prediction models that will be applied can be adjustable, as desired.

Accordingly, the prediction model is trained using data from a group/cluster of common security alerts. Previously, these common security alerts were analyzed to identify reasons as to why they are similar to one another. This analysis was based off of identifying the attributes of those alerts (e.g., date, time, computer system, etc.). Some, or all, of this attribute data may be maintained in a separate database, or it may be maintained with the prediction model.

The embodiments are able to analyze the new security alert, detect its attributes, and then compare those attributes to the attributes of the previously clustered/grouped security alerts. From this comparison, a result may be obtained, where the result indicates a correlation between the new security alert and at least one of the prediction models. This correlation may be expressed in terms of a ranking or a proportion. To illustrate, the correlation may indicate that the new security alert's attributes are about 80% similar to a particular cluster (e.g., cluster 510 from FIG. 5) and that particular cluster's prediction model. Relatedly, the correlation may indicate that the new security alert's attributes are about 15% similar to another cluster (e.g., cluster 505 from FIG. 5), and about 5% similar to yet another cluster (e.g., cluster 515 from FIG. 5). In this regard, one single cluster and prediction model may be identified or, alternatively, a set of multiple clusters and multiple models may be identified. Once identified, then they can be selected for use. In some embodiments, the prediction models are automatically selected for use while in other embodiments, the prediction models are displayed to the administrator in the form of a list. The administrator may then be provided with the option to pick and choose which prediction model will actually be selected for use in responding to a new security alert. Of course, those models provided in the list may be ranked, and the ranking may be displayed with the models.

It will also be appreciated that some embodiments utilize a filtering technique when identifying related clusters and prediction models. For instance, some embodiments establish a threshold bar, or minimum correlation requirement, when identifying a cluster and its related prediction model. As an example, some embodiments may mandate that a correlation of at least 65% must be made in order for a cluster and prediction model to be used or recommended for use. In the example from above, such a threshold would eliminate the second two options (e.g., cluster 505 which had a correlation of 15% and cluster 515 which had a correlation of 5%) such that only the first cluster and prediction model would be used (i.e. only cluster 510 which had an 80% correlation). In scenarios where multiple clusters and prediction models satisfy the minimum threshold requirement, then multiple prediction models may be used or recommended for use.

Once one (or possibly more than one) prediction model is selected, method 100 continues with act 115 in which the selected prediction model is then applied to the new security alert. When the new security alert is fed into, or rather provided as input to, the selected prediction model, the prediction model then generates a set of recommended one or more steps to follow for responding to the new security alert. As an example and with reference to FIG. 7, instead of having the administrator perform queries 750 and 755, the prediction model may recommend that the administrator simply perform a single query on the group of users 730. In this regard, the number of steps that the administrator would perform is significantly reduced. Accordingly, methods 100 and 200 demonstrate techniques for training and utilizing a prediction model to dynamically generate a sequence of recommended steps/actions to follow to investigate and respond to a new security alert.

Example Architecture(s)

Figure 8:
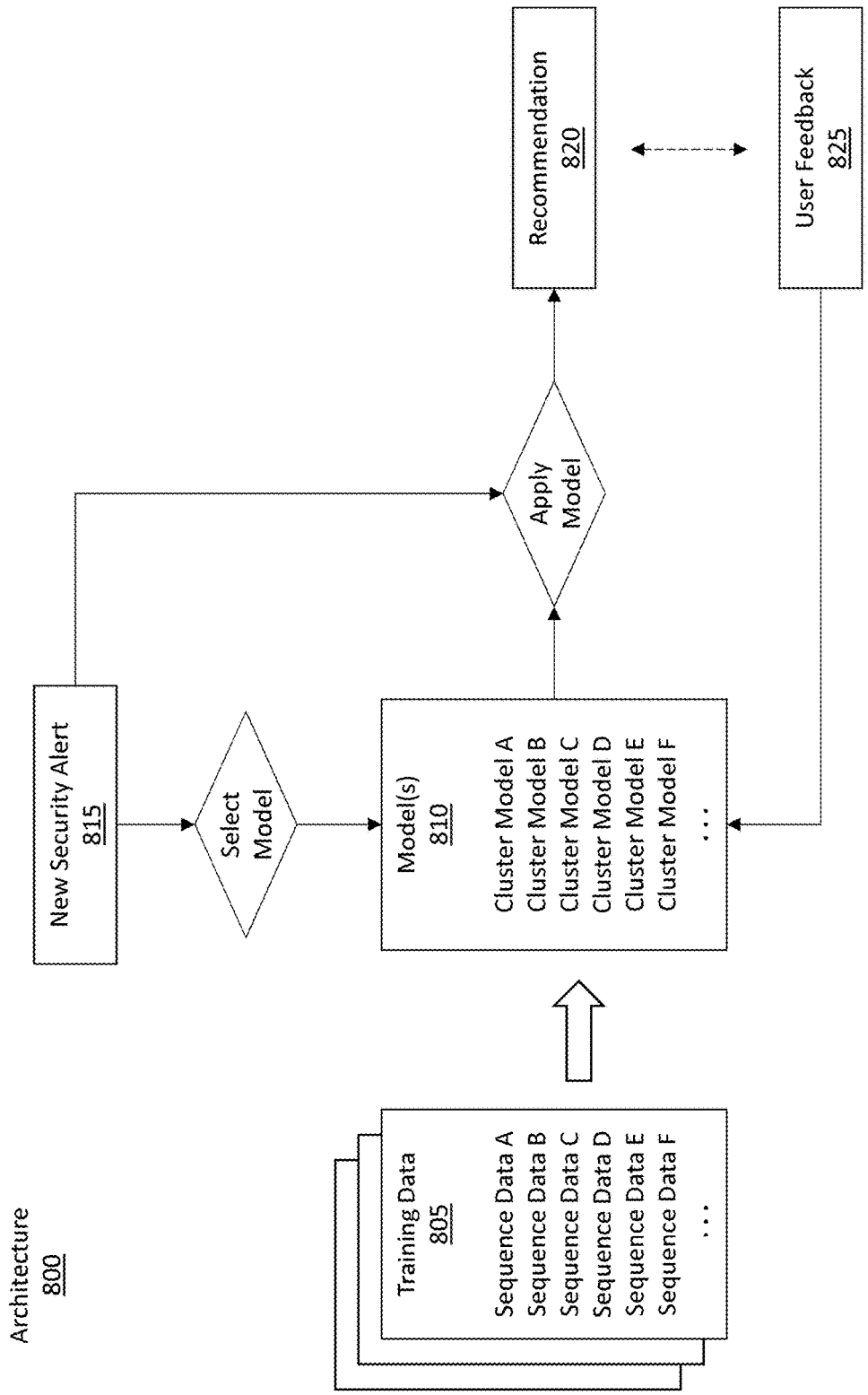
FIG. 8 illustrates an example architecture and technique for training a prediction model using past security alert data, for applying that prediction model to a new security alert, and for updating the prediction model based on user feedback obtained in response to the recommended response actions.

Attention will now be directed to FIG. 8 which shows an example architecture 800 and related flowchart for implementing the disclosed embodiments. Architecture 800 includes a set of training data 805 that may be obtained from any source, such as, for example, a single computer system or numerous computer systems that collectively provide a "crowd sourced" corpus of training data. As shown, the training data 805 may include any number of sequences of steps that were used to investigate and respond to different security alerts, as described in connection with FIGS. 6 and 7. It will be appreciated that training data 805 may be compiled all at once or, additionally or alternatively, may be compiled in a rolling basis in which additional training data is incrementally collected and added to existing training data. In this regard, any number of different sets of training data may be used, and the embodiments are not limited to operating only on a single set. Additionally, the training data 805 may include any type of security alert data such as, for example, malware security alerts, virus security alerts, update security alerts, or even unauthorized access security alerts, just to name a few. Furthermore, training data 805 may be compiled from audit reports that have been analyzed, from insight data (e.g., survey data), or from any other source capable of describing security alerts and how those security alerts were investigated and responded to.

In some embodiments, training data 805 includes highly detailed and granular information whereas in other embodiments training data 805 provides only high-level information. For instance, in the highly granular/detailed reports, administrators who responded to the previous security alerts may have provided detailed investigation descriptions as well as feedback data ranking or otherwise describing the effectiveness of the overall investigative process and/or the effectiveness of each individual step included in the process. As an example, in FIG. 7, an administrator may indicate that query 750 was not worthwhile in responding to security alert 705 whereas query 760 and/or query 765 was highly worthwhile for resolving the security alert 705. As such, the administrator may give a high ranking for queries 760 and 765 (e.g., a grade of "A", 4 or 5 stars, or a high percentage ranking such as 92% or 95%) and give a low ranking for query 750 (e.g., a grade of "D" or "F", 0 or 1 star, or a low percentage ranking such as 22% or 25%). Accordingly, in some embodiments, one, some, or all of the sequences of steps that were followed in responding to the previous security alerts are ranked with user feedback (which may be included in the received sequences of steps or even in the audit report of FIG. 3) based on an effectiveness for how that sequence of a particular investigation step within a sequence contributed to the investigation and resolution of a security alert.

Once at least some of the training data 805 is compiled, it is fed as training input into one or more prediction models 810, as discussed earlier. There may be any number of different prediction models 810, where each model may correspond to a particular one cluster/grouping of security alerts. In this manner, the prediction models 810 are trained using the training data 805. It will also be appreciated that the prediction models 810 may have an initial training as well as subsequent trainings. For example, as new training data is received (e.g., user feedback or other types of new data, as will be discussed momentarily), the prediction models 810 may be updated to reflect this new training data. Accordingly, the training models 810 are dynamically scalable to support any number of training events or amount of training data.

When a new security alert 815 is received in architecture 800, architecture 800 causes a particular one prediction model (though possibly more than one model may be used, as discussed earlier) to be applied to the new security alert 815. The selected model is then applied to the new security alert 815, and the selected model generates a recommendation 820, which may include a sequence of one or more recommended steps or actions (e.g., investigative executions, queries, analyses, etc.) that are recommended to be followed to respond to the new security alert 815. In some instances, new security alert 815 was not included in the training data 805, which included previous security alerts. Consequently, the new security alert 815 was not used to actually train any of the prediction models 810. In this regard, the prediction models 810 are able to operate and provide recommendations on entirely new types of security alerts and are not limited to known types of security alerts.

In some embodiments, multiple different recommendations may be provided, where each recommendation is associated with a probability or ranking describing how likely that sequence will be in successfully investigating, resolving, or otherwise responding to the new security alert 815. In some embodiments, the sequence of steps may actually include different branches such that multiple alternative acts may be performed in lieu of one another. For example, the recommendation may state that investigation step "A" should first be performed and then either step "B" or, alternatively, step "C" should be performed after step "A." In such scenarios, each branch (e.g., branch "B" or branch "C") may also be provided with a corresponding probability indication describing the likelihood that the branch will successfully contribute to the investigation or resolution of the new security alert 815.

In other embodiments, irrespective of whether there are multiple branches in the recommendation, each individual step in the sequence may be provided with a probability indication describing the likelihood that the step will successfully contribute to the investigation or resolution of the new security alert 815. Accordingly, recommendations as a whole, individual branches within a recommendation, or even individual steps within a recommendation may each be provided with a corresponding probability metric describing how likely that recommendation, branch, or step will contribute to the investigation or resolution of the new security alert 815.

Architecture 800 also includes the ability to receive and respond to user feedback 825. For instance, when a recommendation 820 is submitted to an administrator, the administrator may follow the recommendation 820 and come to a successful resolution of the new security alert 815. In such scenarios, it is beneficial to receive user feedback 825 from the administrator to indicate the successfulness of the recommendation 820. In other instances, the recommendation 820 may result in a failed resolution of the new security alert 815, and the user feedback 825 may indicate this failure. In yet other scenarios, the administrator may provide the user feedback 825 without actually performing the steps described in the recommendation 820. That is, the administrator may have experience or knowledge regarding the probability of success or failure for the recommendation 820, and the administrator can preemptively provide the user feedback 825.

In other scenarios, user feedback 825 may be inferred feedback where the architecture 800 independently determines the worth of the recommendation 820 even in the absence of explicit feedback from the administrator. For instance, if the administrator followed the recommendation 820 and successfully resolved the new security alert 815, but the administrator did not provide explicit feedback, then the architecture 800 can nevertheless infer that the recommendation 820 was worthwhile. On the contrary, if the administrator did not use the recommendation 820 or did use the recommendation 820 but ultimately did not achieve a successful resolution of the new security alert 815, then the architecture 800 may infer that the recommendation 820 was not worthwhile. Accordingly, the user feedback 825 may be explicit or implicit.

Such user feedback 825 is particularly beneficial because it can be received and then fed as training data back into the prediction models 810 so as to update the prediction models 810. In this regard, the prediction models 810 can continually learn and dynamically adapt as new security alerts are received. By learning from the user feedback 825 (both explicit and implicit), the prediction models 810 will be able to provide more robust and reliable recommendations.

It will also be appreciated that the different prediction models 810 can learn from each other and from feedback provided to other prediction models. That is, the learning is not an isolated and restricted occurrence. Instead, the prediction models 810 can perform hive-like learning in which all of the prediction models 810 collectively learn from all types of user feedback 825.

In some instances, individual steps in a recommended sequence may be ranked by an administrator such that different levels of granularity may be included within the user feedback 825. For example, the recommendation as a whole (i.e. the sequence of steps that were recommended to respond to the new security alert) may be ranked via user feedback 825, and individualized portions (e.g., steps) of the recommendation may each be ranked via user feedback 825.

Accordingly, the disclosed embodiments provide substantial benefits to the technical field of investigating, troubleshooting, and responding to security alerts. It will be appreciated that the phrase "security alert" should be interpreted broadly to mean any type of computer-related occurrence or alert that an administrator may need to respond to in order to improve the efficiency of the computer system. The embodiments are also able to select an optimal prediction model to respond to a new security alert. By optimal, it is meant that the embodiments are able to select at least one model that most closely corresponds with the new security alert. In this regard, a selected model may be used to generate a recommendation for investigating and/or responding to a new security alert. In some embodiments, the process of generating the recommendation may be performed by comparing the new security alert's attributes to attributes of other previous security alerts to identify a set of previous security alerts that are most closely related to the new security alert (e.g., a threshold number of attributes are sufficiently common or related) and then selecting a compatible prediction model based on this comparison analysis. Thereafter, in some embodiments, the recommendation may be generated by identifying and analyzing previous sequence steps that were used in responding to the previous security alerts, which are determined to now be closely related to the new security alert, so as to generate an entirely new recommendation.

Example Computer System(s)

Figure 9:
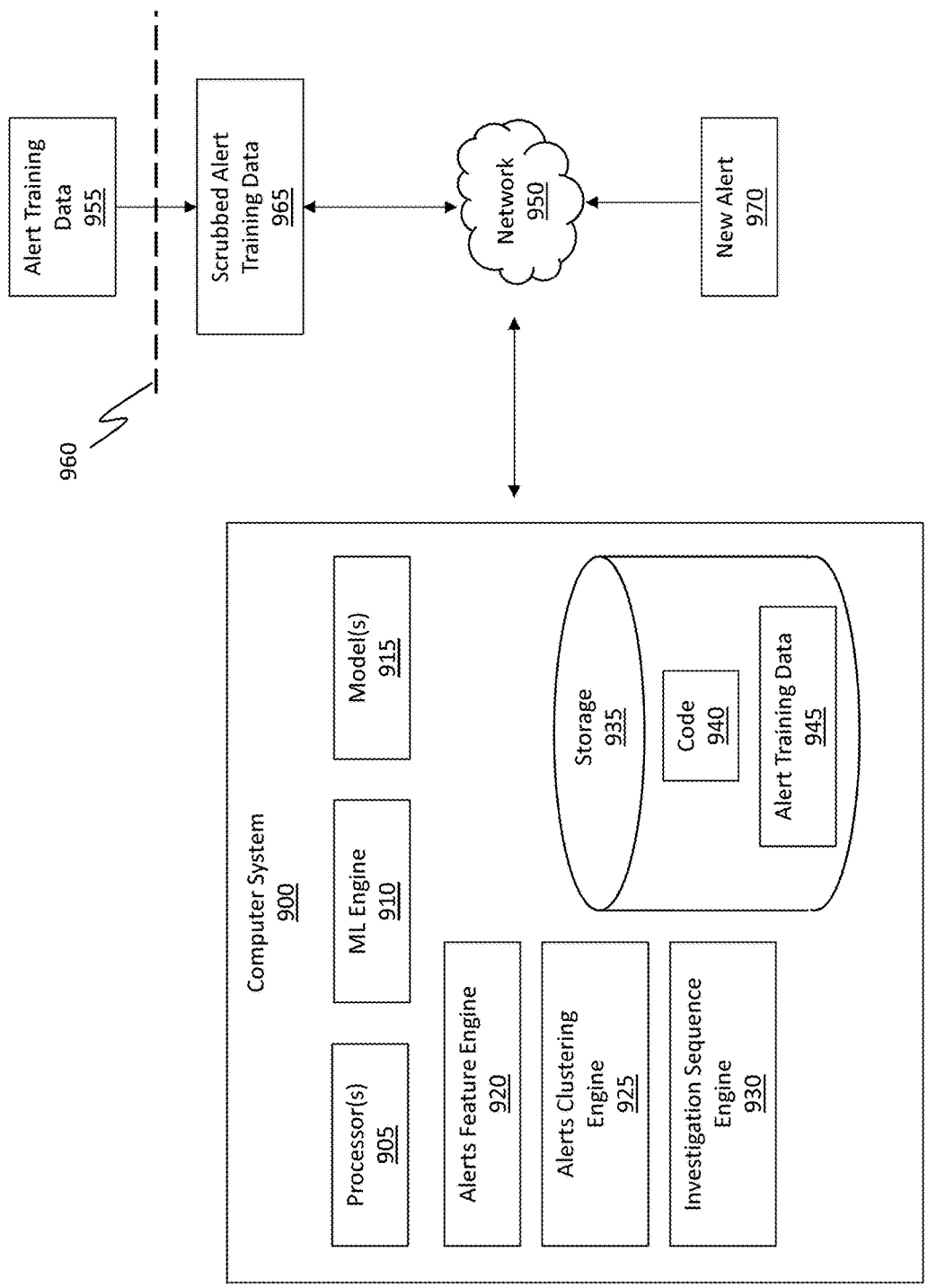
FIG. 9 illustrates an example computer system specially configured to perform any of the disclosed operations.

Attention will now be directed to FIG. 9 which illustrates an example computer system 900 that may be used to facilitate the operations described herein. Computer system 900 may take various different forms. For example, in FIG. 9, computer system 900 may be embodied as a tablet, a desktop, a distributed system that includes one or more connected computing components/devices that are in communication with computer system 900, a laptop computer, a mobile phone, a server, a data center, and/or any other computer system.

In its most basic configuration, computer system 900 includes various different components. For example, FIG. 9 shows that computer system 900 includes at least one processor 905 (aka a "hardware processing unit"), a machine learning ("ML") engine 910, model(s) 915 (e.g., prediction models), an alerts feature engine 920, an alerts clustering engine 925, an investigation sequence engine 930, and storage 935.

The storage 935 may include computer-executable instructions in the form of code 940 as well as any amount of alert training data 945. Storage 935 may be physical system memory, which may be volatile, non-volatile, or some combination of the two. The term "memory" may also be used herein to refer to non-volatile mass storage such as physical storage media. If computer system 900 is distributed, the processing, memory, and/or storage capability may be distributed as well.

As used herein, the term "executable module," "executable component," "engine," or even "component" can refer to software objects, routines, or methods that may be executed on computer system 900. The different components, modules, engines, and services described herein may be implemented as objects or processors that execute on computer system 900 (e.g. as separate threads). It will be appreciated that engines, modules, or components may be a combination of one or more processors and executable instructions that cause the processor(s) to perform specialized functions, such as those described throughout this disclosure and in particular with relation to each individual method act described in FIGS. 1 and 2.

In other instances, the components, modules, or engines may simply be executable instructions that are executable by any type of processor. In yet other instances, the components, modules, or engines, may be in the form of ASICs or even system-on-chip ("SOC") devices specially configured to perform any individual operation (e.g., any one act included in the methods 100 or 200 from FIGS. 1 and 2, respectively) or to perform multiple operations (e.g., any combination of the method acts from FIGS. 1 and 2). In this regard, a component, module, or engine can be thought of as a hardware processing unit, a compilation of executable code, or combinations of the above that enable a computer system to perform specialized operations.

The disclosed embodiments may comprise or utilize a special-purpose or general-purpose computer including computer hardware, such as, for example, one or more processors (such as processor 905) and system memory (such as storage 935), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The ML engine 910 may be used to perform any of the machine learning processes described earlier. Furthermore, the ML engine 910 may include any type and/or combination of machine learning algorithm(s) or device(s), including one or more multilayer neural network(s), recursive neural network(s), deep neural network(s), decision tree model(s) (e.g., decision trees, random forests, and gradient boosted trees), linear regression model(s), logistic regression model(s), support vector machine(s) ("SVM"), artificial intelligence device(s), and/or any other type of intelligent computing system. In this regard, the ML engine 910 may be used to generate the model(s) 915. In some embodiments the different clusters of the previous security alerts may also be grouped together by the machine learning engine 910 or some other machine learning algorithm.

Additionally, or alternatively, the alerts feature engine 920, alerts clustering engine 925, and investigation sequence engine 930 may be used to generate all or portions of the model(s) 915. To illustrate, the alerts feature engine 920 may be used to identify one or more attributes for each of the previous security alerts. Similarly, the alerts clustering engine 925 may be used to group together the different clusters of the previous security alerts. The investigation sequence engine 930 may be used to identify the sequences of steps that were followed in responding to each of the different previous security alerts. The processors 905 and/or ML engine 910 may also be used to perform any of these steps/acts or any of the other steps/acts in either method 100 or method 200.

The alert training data 945 may correspond to the information stored for each of the different security alerts. For instance, the alert training data 945 may include the audit report 300 from FIG. 3, or any other information describing previous or even current security alerts. In this regard, the alert training data 945 can be viewed as a repository/corpus of training data used to train the model(s) 915 (e.g., the training data 805 from FIG. 8).

Computer system 900 may also be connected (via a wired or wireless connection) to external sensors (e.g., one or more remote cameras, accelerometers, gyroscopes, acoustic sensors, magnetometers, data acquisition systems, etc.). Further, computer system 900 may also be connected through one or more wired or wireless networks 950 to remote/separate computer systems(s) that are configured to perform any of the processing described with regard to computer system 900. Although not shown, computer system 900 may also include any number of input/output ("I/O") devices (e.g., a display, keyboard, mouse, etc.) or engines (display graphics or a graphics rendering engine) that may be configured, with processor 905, to render one or more images for a user.

A "network," like the network 950 shown in FIG. 9, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 900 will include one or more communication channels that are used to communicate with the network 950. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Through network 950, the computer system is able to obtain previous security alert training data 955 (e.g., additional crowd sourced alert data as described earlier). In some instances, the alert training data 955 may include personal information about a user/computer who is submitting the alert data or about a user/computer who caused the security alert to be triggered. In some instances, a scrubbing mechanism may be used to screen or scrub 960 the alert training data 955 to generate scrubbed alert training data 965, in which the personal identifying information is removed, anonymized, or otherwise modified so that the originating user/computer is not identifiable. This scrubbed alert training data 965 may then be used to train the model(s) 915 in a manner so as to preserve user privacy, if so desired.

In this regard, at least some of the alert training data 945 stored or maintained by computer system 900 may be received from one or more external sources (e.g., provided via crowd sourcing techniques) as opposed to being generated by computer system 900 itself. Accordingly, the disclosed embodiments are able to maintain any level of privacy or security. Additionally, through network 950, computer system 900 is able to receive any number of new security alerts, such as new alert 970, which is representative of new security alert 815 from FIG. 8. New alert 970 may also be representative of the new security alert discussed at least in act 115 of method 100 from FIG. 1.

It will also be appreciated that computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 905). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
   one or more processors; and
   one or more computer-readable hardware storage devices having stored thereon computer-executable instructions that are executable by the one or more processors to cause the computer system to:
      generate training data for use in training a plurality of prediction models by performing the following:
      identify previous security alerts;
      group the previous security alerts into different clusters;
      for each of at least some previous security alerts in each of the different clusters, identify a sequence of steps that were followed in responding to each of said at least some previous security alerts; and
      for each of the different clusters, train a corresponding prediction model using the identified sequences of steps, wherein each of the different clusters includes different training data corresponding to different sequences of steps, such that each of the plurality of prediction models, corresponding to one of the different clusters, is trained to generate different recommendations of steps to follow for responding to new security alerts;

after the plurality of prediction models is trained and after identifying one or more attributes of a new security alert, select one prediction model from the plurality of prediction models to be applied to the new security alert, wherein selecting the one prediction model is performed by determining that, out of the plurality of prediction models, the one prediction model is optimal for being applied to the new security alert based on the new security alert's one or more attributes; and apply the one prediction model to the new security alert to generate a set of recommended one or more steps to follow for responding to the new security alert.

2. The computer system of claim 1, wherein grouping together the different clusters of the previous security alerts is performed by:

identifying one or more attributes for each alert included in the previous security alerts; and generating the different clusters by grouping together common alerts that are identified as having commonalities between their corresponding one or more attributes.

3. The computer system of claim 2, wherein the one or more attributes for each alert included in the previous security alerts is obtained by identifying one or more of the following for each alert: an alert type, an alert date, or alert metadata.

4. The computer system of claim 3, wherein the one or more attributes for each alert included in the previous security alerts is additionally obtained by identifying one or more of the following for each alert: a related process executing when each alert was raised, a communicating IP address of a corresponding computer system that raised each alert, a communicating port, or a relevant user.

5. The computer system of claim 1, wherein the new security alert was not included in the previous security alerts such that the new security alert was not used to train any prediction model in the plurality of prediction models.

6. The computer system of claim 1, wherein the previous security alerts include malware security alerts, virus security alerts, and unauthorized access security alerts.

7. The computer system of claim 1, wherein the previous security alerts are identified by analyzing one or more audit reports that include the previous security alerts, or alternatively, by analyzing insight data associated with the previous security alerts.

8. The computer system of claim 1, wherein the different clusters of the previous security alerts are grouped together by a machine learning algorithm.

9. The computer system of claim 8, wherein the machine learning algorithm uses either a k-means clustering algorithm or a density-based spatial clustering (DB-SCAN) algorithm.

10. The computer system of claim 1, wherein execution of the computer-executable instructions further causes the computer system to:

receive user feedback regarding the set of recommended one or more steps to follow for responding to the new security alert; and update at least the one prediction model based on the received user feedback.

11. A method for providing a dynamically generated sequence of one or more recommended response actions that are generated in response to feeding a security alert into a prediction model that generates the dynamically generated sequence, the method being performed by a computer system and comprising:

generating training data for use in training a plurality of prediction models by performing the following:

identifying previous security alerts;

grouping the previous security alerts into different clusters;

for each of at least some previous security alerts in each of the different clusters, identifying a sequence of steps that were followed in responding to each of said at least some previous security alerts; and for each of the different clusters, training a corresponding prediction model using the identified sequences of steps, wherein each of the different clusters includes different training data corresponding to different sequences of steps, such that each of the plurality of prediction models, corresponding to one of the different clusters, is trained to generate different recommendations of steps to follow for responding to new security alerts;

after the plurality of prediction models is trained and after identifying one or more attributes of a new security alert, selecting one prediction model from the plurality of prediction models to be applied to the new security alert, wherein selecting the one prediction model is performed by determining that, out of the plurality of prediction models, the one prediction model is optimal for being applied to the new security alert based on the new security alert's one or more attributes; and applying the one prediction model to the new security alert to generate a set of recommended one or more steps to follow for responding to the new security alert.

12. The method of claim 11, wherein the computer system includes:

an alerts feature engine for identifying one or more attributes for each of the previous security alerts;

an alerts clustering engine for grouping together the different clusters of the previous security alerts; and an investigation sequence engine for identifying the sequence of steps that were followed in responding to each of said at least some previous security alerts.

13. The method of claim 11, wherein the previous security alerts are visualized in an n-dimensional space plot.

14. The method of claim 11, wherein steps included the sequences of steps followed in responding to the previous security alerts includes one or more of the following: a first execution step in which an alerting computer that raised a particular security alert is identified, a second execution step in which a query is executed on the alerting computer system to identify users of the alerting computer system, a first analysis step in which a result of the query is analyzed, and a third execution step in which a particular user of the alerting computer system is identified.

15. The method of claim 11, wherein at least some of the previous security alerts are received from an external source as opposed to being generated by the computer system.

16. One or more hardware storage devices having stored thereon computer-executable instructions that are executable by one or more processors of a computer system to cause the computer system to:

generate training data for use in training a plurality of prediction models by performing the following:

identify previous security alerts;

group the previous security alerts into different clusters;

for each of at least some previous security alerts in each of the different clusters, identify a sequence of steps that were followed in responding to each of said at least some previous security alerts; and for each of the different clusters, train a corresponding prediction model using the identified sequences of steps, wherein each of the different clusters includes different training data corresponding to different sequences of steps, such that each of the plurality of prediction models, corresponding to one of the different clusters, is trained to generate different recommendations of steps to follow for responding to new security alerts;

after the plurality of prediction models is trained and after identifying one or more attributes of a new security alert, select one prediction model from the plurality of prediction models to be applied to the new security alert, wherein selecting the one prediction model is performed by determining that, out of the plurality of prediction models, the one prediction model is optimal for being applied to the new security alert based on the new security alert's one or more attributes; and apply the one prediction model to the new security alert to generate a set of recommended one or more steps to follow for responding to the new security alert.

17. The one or more hardware storage devices of claim 16, wherein at least some of the previous security alerts are provided via crowd sourcing.

18. The one or more hardware storage devices of claim 17, wherein personal identifying information included within the at least some of the previous security alerts provided via crowd sourcing is scrubbed.

19. The one or more hardware storage devices of claim 16, wherein the prediction model generates the set of recommended one or more steps by:

comparing the new security alert's one or more attributes to attributes of other previous security alerts to identify a set of previous security alerts that are most closely related to the new security alert; and generate the set of recommended one or more steps by identifying and analyzing sequence steps used in responding to the set of previous security alerts that are most closely related to the new security alert.

20. The one or more hardware storage devices of claim 16, wherein the sequence of steps that were followed in responding to each of said at least some previous security alerts are ranked using user feedback and are ranked based on effectiveness for resolving each of said at least some previous security alerts.

* * * * *